United States Patent [19]
Kempf

[11] Patent Number: 5,477,715
[45] Date of Patent: Dec. 26, 1995

[54] ADAPTIVE SPRING WINDING DEVICE AND METHOD

[75] Inventor: Mark A. Kempf, Eagan, Minn.

[73] Assignee: Reell Precision Manufacturing Corporation

[21] Appl. No.: 341,307

[22] Filed: Nov. 16, 1994

Related U.S. Application Data

[63] Continuation of Ser. No. 865,353, Apr. 8, 1992, abandoned.

[51] Int. Cl.⁶ .................... B21F 3/02; B21F 35/02
[52] U.S. Cl. .................. 72/12; 72/132; 72/135; 140/103
[58] Field of Search .................. 72/10, 11, 12, 72/130, 131, 135, 137, 138, 132; 140/71 R, 103, 104

[56] References Cited

U.S. PATENT DOCUMENTS

| | | | |
|---|---|---|---|
| 3,028,904 | 4/1962 | Halvorsen | 72/130 |
| 3,555,863 | 1/1971 | Svensson | 72/135 |
| 3,874,425 | 4/1975 | Guenther | 140/103 |
| 3,906,766 | 9/1975 | Sato | 72/12 |
| 4,112,721 | 9/1978 | Takese et al. | 72/12 |
| 4,296,621 | 10/1981 | Ohdai et al. | 72/130 |
| 4,542,635 | 9/1985 | Matsuoka | 72/137 |
| 4,607,513 | 8/1986 | Russell | 72/137 |
| 4,627,255 | 12/1986 | Archer et al. | 72/10 |
| 4,672,549 | 6/1987 | Saxton | 72/138 |
| 4,680,950 | 7/1987 | Ohdai et al. | 72/130 |
| 4,745,951 | 5/1988 | Guenther | 140/103 |
| 4,821,390 | 4/1989 | Seyler | 27/173 |
| 4,893,491 | 1/1990 | Ohdai et al. | 72/137 |

FOREIGN PATENT DOCUMENTS

| | | | |
|---|---|---|---|
| 0154238 | 11/1981 | Japan | 140/103 |
| 0147332 | 11/1984 | Japan | 140/103 |
| 63-52726 | 3/1988 | Japan | 140/103 |
| 63-52724 | 3/1988 | Japan | 140/103 |
| 0137519 | 6/1988 | Japan | 72/135 |
| 0035831 | 2/1991 | Japan | 140/103 |
| 3-193231 | 8/1991 | Japan | 140/103 |

Primary Examiner—Lowell A. Larson
Assistant Examiner—Thomas C. Schoeffler
Attorney, Agent, or Firm—Merchant, Gould, Smith, Edell, Welter & Schmidt

[57] ABSTRACT

An apparatus includes means for feeding a wire from a fixed outlet against a coiling surface having a variable location in relation to the fixed outlet. The fixed outlet directs the wire in a path and the wire is deflected from the path by the coiling surface to bend the wire. The wire is monitored and output signals indicative of a physical characteristic of the deflected wire are generated. A controller receives the signals and generates control signals as a function thereof. An actuator, responsive to the control signals, adjusts the location of the coiling surface such that the physical characteristics are substantially uniformly maintained during the forming of the spring.

31 Claims, 8 Drawing Sheets

ADAPTIVE SPRING WINDING DEVICE AND METHOD

This is a continuation of application Ser. No. 07/865,353, filed Apr. 8, 1992, abandoned.

FIELD OF THE INVENTION

The present invention relates to a spring winding device and method for forming springs. More particularly, the invention relates to a spring winding device and method for forming springs having generally reproducible parameters within narrow tolerances.

BACKGROUND OF THE INVENTION

Spring winding devices for forming coil springs have been described previously. U.S. Pat. No. 4,893,491 to Ohdai et al., issued Jan. 16, 1990 and assigned to Asahi-Seiki Manufacturing Co., Ltd., describes a spring winding machine and a method for forming coil springs. A wire is fed from a quill against a forming surface. The forming surface is moved to a forward position close to a tip of the quill by a drive system including a cam assembly under numerical control. As the wire is fed from the quill against the forming surface, the wire is bent. By rotating the forming surface, the wire fed from the quill can be bent in different directions such that coil springs of different predetermined forms and sizes are formed. After the coil spring reaches its predetermined form and size, the forming surface is withdrawn from the tip of the quill by the drive system and cam assembly and a cutting tool is moved to a forward position to cut the formed coiled spring away from the wire fed from the quill.

The spring winding device described by Ohdai et al. in the '491 patent provides various cutting and bending tools mounted on a tool mounting frame. These tools can be repositioned relative to the tip of the quill in the same manner as the forming surface. The tool mounting frame includes an opening through which the quill can pass. This allows tools to be mounted and brought in towards the quill and withdrawn from the quill from both front and rear sides of the tool mounting frame. By providing a mechanism for mounting various tools in close proximity to the tip of the quill, a wide variety of bends can be made when forming coil springs. Furthermore, by utilizing numerical control of the apparatus, coil springs can be formed which have a variety of dimensions.

However, because of variations in the dimensions of the wire, variations in the stiffness of spring winding machines, and variations in the wear of the tools on the machines, it is very difficult to form a spring or a batch of springs for certain uses where tight tolerances are required. This is at least partially because the forming surface of the spring winding machine can only be repositioned relative to the tip of the quill with limited precision.

A roll or lot of wire fed from the quill, whether having a round, rectangular, barrel, or any other cross-sectional structure includes many variations. Variations exists in the chemistry depending upon the amount of carbon which is included in the chemical composition of the wire. The different chemical compositions will vary the tensile strength of the wire and also the modulus of elasticity. These wire variations lead to the difficulty of winding springs with tight tolerances.

Differences in lubrication on the wire will change the amount of force which must be applied to the wire at the forming surface in order to bend the wire because of the different surface condition and surface finish. These differences in surface conditions and surface finishes lead to variations in dimensions of coil springs as they are being formed at the forming surface. In addition, because the wire is metal, variations in temperature will contract and expand the wire to a certain degree, leading to further variations in the dimensions of the coil springs.

Many stresses are also incorporated into a lot or a roll of wire used for forming springs. Not only does the tensile strength vary in such a lot of wire, because of the manner in which it was drawn, but the drawing process puts different cast and helix into the wire. Furthermore, the wire is shipped in a large coil. Therefore, the wire is going to have a different cast and helix throughout the coil, from the interior to the exterior.

In addition, many springs are formed by the same tools and the same forming surfaces of a certain spring winding machine. Due to the repetitious forces applied to the tools, the surfaces of the tools will vary over time in response to wear. This wear results in additional inconsistencies when forming springs.

Because of the variations in the condition or other parameters of the wire, the wear on the forming surface and other tools used to bend the wire, and the variations in the positioning of the forming surface as it is repositioned proximate the tip of the quill, significant inconsistencies in various parameters of individual coil springs within any particular batch of coil springs will occur. In many industrial applications it is necessary to provide coil springs having consistent parameters with narrow tolerances. These tolerances must be narrow both in regard to individual wraps within a single spring and in regard to individual springs within a batch or lot of springs. Applications for springs requiring such narrow tolerances include use within wrap spring clutches for office copy machines, such as those manufactured by Reell Precision Manufacturing Corporation, St. Paul, Minn.

Various other aspects of spring winding can lead to further inconsistencies in the parameters of a single spring and/or a batch of springs. For example, when a spring is cut after being formed by a spring winding machine, as described above, if the spring is allowed to drop a distance to a surface, stress is added and a widening of the distribution of various parameters occurs. In addition, inconsistent heat treating of the springs after they are bent by the forming surface can lead to additional variations in parameters of the coil springs. Therefore, if springs are positioned in an oven where springs are heat treated at a temperature which does not have a uniform profile, variations in the dimensions or other parameters of the spring can occur.

SUMMARY OF THE INVENTION

Accordingly, the present invention provides an apparatus for forming a spring or springs from a wire. The apparatus comprises means for feeding the wire from a fixed outlet against a coiling surface having a variable location in relation to the fixed outlet, means for monitoring the wire and for generating output signals indicative of a physical characteristic of the deflected wire, control means for receiving said output signals and generating signals as a function thereof, and actuation means responsive to the control signals for adjusting the location of the coiling surface such that the physical characteristic is substantially uniformly maintained during the forming of the spring or springs. The fixed outlet directs the wire in a path from which the wire is deflected by the coiling surface so as to bend the wire.

In the preferred embodiments, monitoring means include detection means for detecting a position of the wire indicative of a diameter of the spring. The detection means preferably include a linear variable differential transducer positioned relative to the fixed outlet of said feeding means through which the wire is fed.

3

In another preferred embodiment, the detection means include a laser for directing laser beams at a surface of the wire, and means for receiving the reflection of the laser beams. In an alternate embodiment the detection means include an inductive gauging device positioned relative to the fixed outlet. In addition, said actuation means preferably include a piezoelectric translator for adjusting the coiling surface.

In addition, a method of forming a spring from a wire includes the macro-positioning of a coiling surface of a position in relation to a fixed wire outlet. The wire is monitored and output signals generated indicative of a physical characteristic of the deflected wire. The position of the coiling surface is then micro-adjusted in response to the control signals generated as a function of the output signals such that the physical characteristic is substantially uniformly maintained while the spring is formed.

In yet another embodiment of the invention, a method for forming a plurality of springs is provided. A first spring is formed by feeding the wire through the fixed wire outlet against the coiling surface and the wire is deflected with the coiling surface to bend the wire. The coiling surface is retracted from the location in relation to the fixed wire outlet after a first spring is formed. The coiling surface is macro-positioned substantially to the location of the coiling surface prior to retraction. The location of the coiling surface prior to retraction and after being macro-positioned is detected and position signals representative thereof are generated. The coiling surface is micro-adjusted, after being macro-positioned, as a function of the position signals to the location detected prior to retraction to form a second spring.

These and various other advantages and features of novelty which characterize the present invention are pointed out with particularity in the claims and next formative part hereof. However, for a better understanding of the present invention, its advantages, and other objects obtained by its use, reference should be made to the drawings which form a further part hereof and the accompanying descriptive matter, in which there is illustrated and described a preferred embodiment of the present invention.

BRIEF DESCRIPTION OF THE DRAWINGS

In the drawings, in which like reference numerals indicate corresponding parts of the preferred embodiment of the present invention throughout the several views.

4

DETAILED DESCRIPTION OF THE PREFERRED EMBODIMENT

Figure 1:
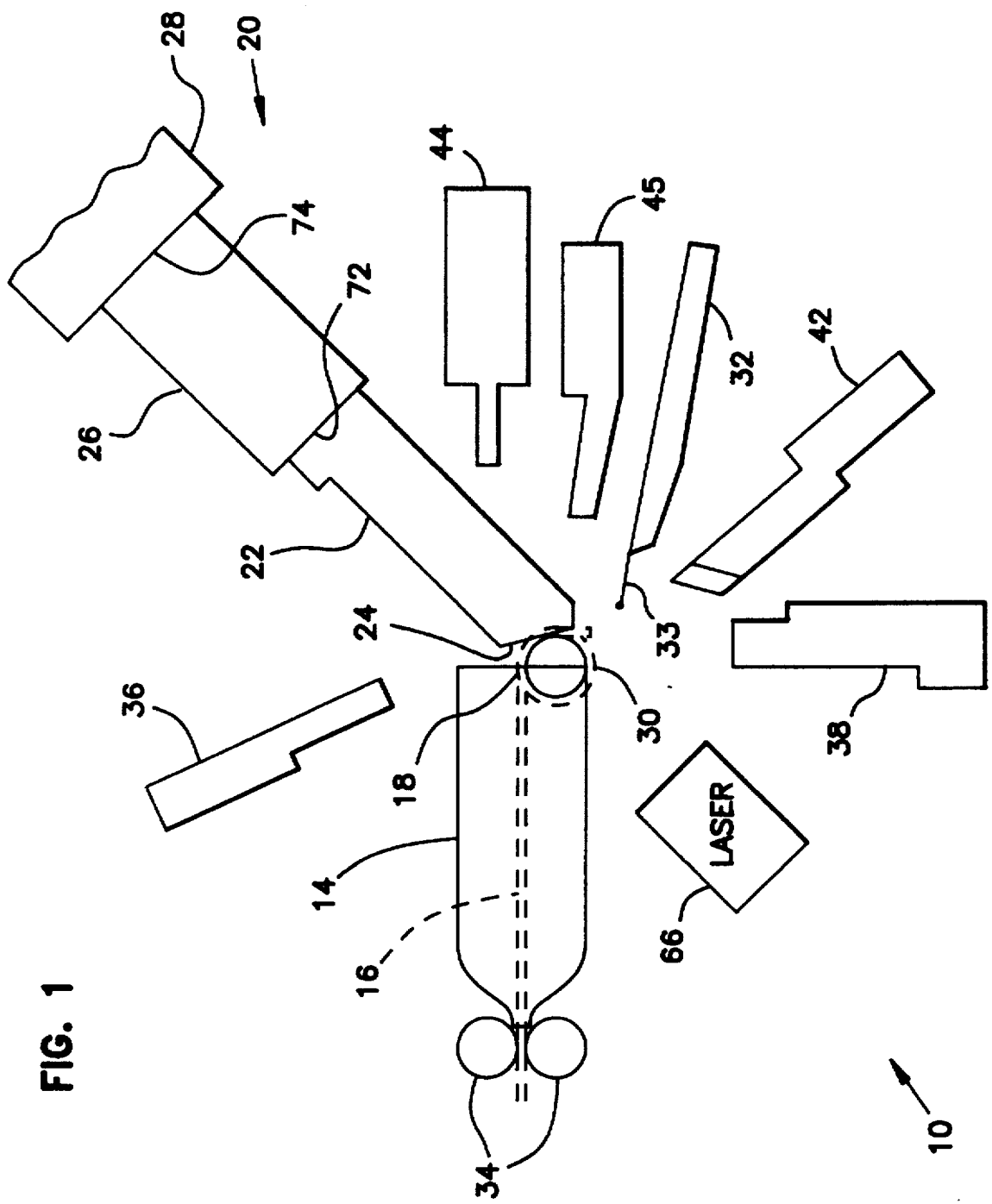
FIG. 1 is a diagrammatical view of various elements used in the forming of a spring from a wire.
Figure 2:
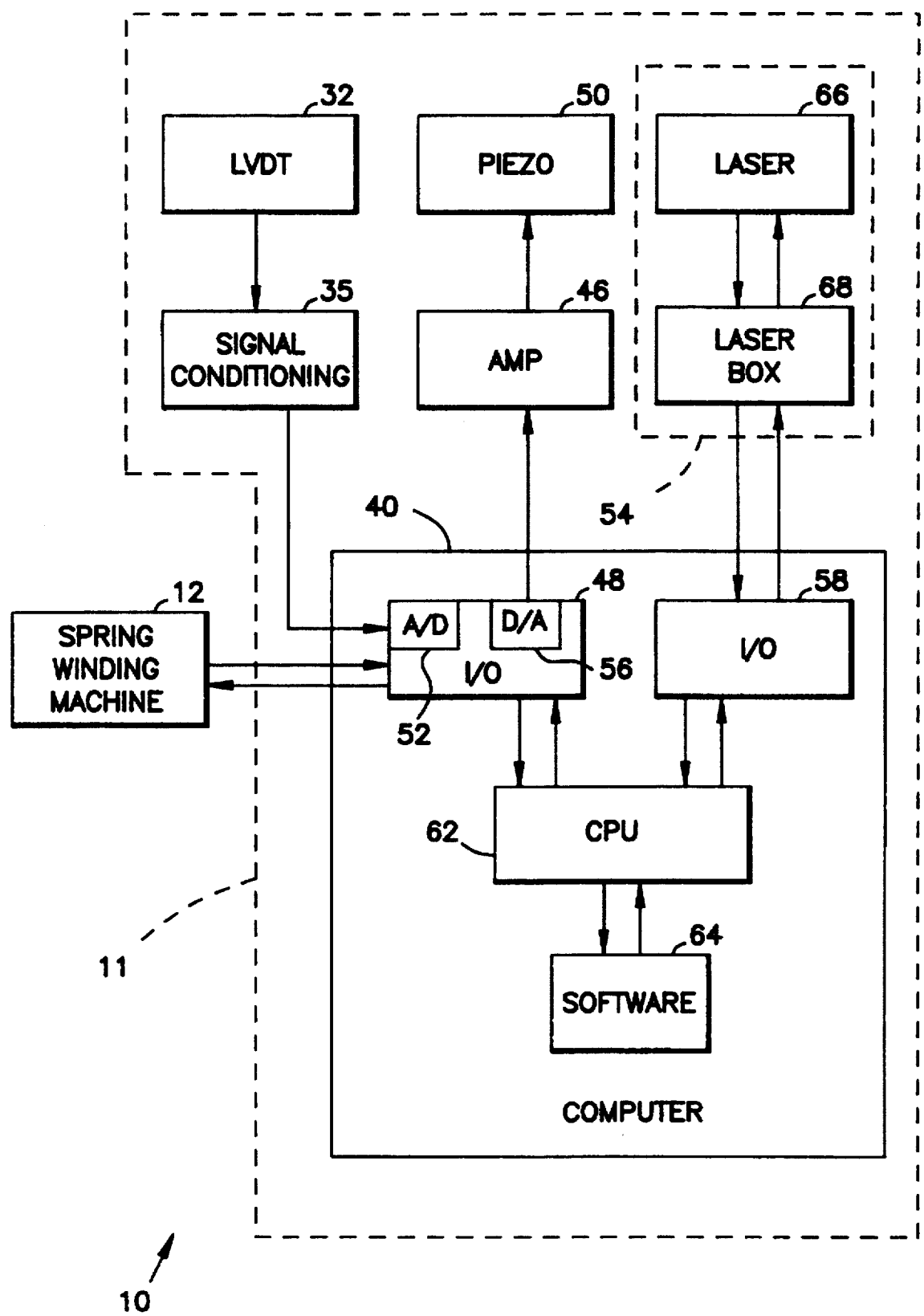
FIG. 2 is a block diagram showing an electrical overview of the present invention.

The adaptive spring winding device of the present invention will be described generally with reference to FIGS. 1–3. FIGS. 1 and 2 show in diagrammatical and block form an adaptive spring winder 10 with an adjustable coiling point for forming springs, such as a coil spring, FIG. 3. The adaptive spring winder 10, includes a standard numerical controlled spring winding machine 12, FIG. 2, having a quill 14 for feeding a wire 16 from a fixed outlet 18 against a coiling tool 20. The coiling tool 20 includes a coiling point 22 having a coiling surface 24 for deflecting the wire to bend the wire to form a spring 30. The spring winder 10 further includes a system 11 for adjusting the coiling point as a spring is being formed.

The coiling tool 20 further includes a piezoelectric translator slide 26 which is part of system 11 for adjusting the coiling point 22. The piezo slide 26 is connected to the coiling point 22 and to the spring winding machine 12 by a drive mechanism and cam assembly 28, diagrammatically represented in FIG. 1. A Linear Variable Differential Transducer (LVDT) 32 is utilized to detect a position of the wire 16 as spring 30 is being formed and for providing output signals to the computer 40 which produces control signals for controlling a piezoelectric translator 50, FIG. 5, operatively mounted on piezo slide 26. The piezoelectric translator 50 micro-adjusts the coiling point 22 as a function of the output signals from LVDT 32 after the numerically controlled spring winding machine 12 has brought the coiling point 22 into a location for deflection of the wire 16 by coiling surface 24.

Laser 54 of the system 11 is provided to detect the position of the coiling surface 24 prior to retraction of the coiling point by the spring winding machine 12 after a first spring is formed. Laser 54 generates position signals which are applied to computer 40 to generate control signals for the piezoelectric translator 50 operatively mounted on piezo slide 26. When the coiling point 22 is brought in to form a second spring by the numerically controlled spring winding machine 12, the piezoelectric translator 50 in response to the control signals generated as a function of the positions detected by laser 54 adjusts the coiling point 22 so the coiling point is at the position detected prior to retraction.

The adaptive spring winder 10 will further be described in detail with reference to FIGS. 1–5. FIGS. 1 and 2 show the adaptive spring winder 10 in diagrammatical and block form, respectively. A standard spring winding machine 12 is utilized. Preferably, the standard spring winding machine is an Asahi-Seiki NTF2, manufactured by Asahi-Seiki Manufacturing Company, Limited, of Aichi, Japan. The standard spring winding machine 12 is a numerical controlled machine which controls the winding of springs. A machine like the NTF2 is described in U.S. Pat. No. 4,893,491 to Ohdai et al. and assigned to Asahi-Seiki Manufacturing Company, herein entirely incorporated by reference thereto.

The numerically controlled spring winding machine 12 includes a quill 14 having a fixed outlet 18 through which feed rollers 34 feed a wire 16 in a path therefrom. Under numerical control various tools are brought into particular positions with respect to the fixed outlet 18 to form spring 30. As shown in FIG. 1, a coiling tool 20, a toe bender tool 42, a toe overbend tool 38, a clipping tool 36, an LVDT 32, and a bending mandrel 45 are tools brought into particular locations with respect to the fixed outlet 18. For example, when the numerical controlled spring winding machine 12 begins forming a first spring, the feed rollers 34 are initiated and wire 16 is fed through fixed wire outlet 18. The coiling tool 20 is brought in to form a one-quarter wrap. The coiling tool 20 is then removed and the toe bender 42 and bending mandrel 45 are brought into a position with respect to fixed outlet 18 to start first toe 81, FIG. 3. Thereafter, toe bender tool 42 is withdrawn from its position with respect to the fixed outlet 18 and toe overbend tool 38 is utilized to complete the bending of first toe 81 to a desired shape. The toe overbend tool 38 and bending mandrel 45 are then withdrawn and coiling tool 20 is positioned at a location downstream from the fixed outlet, which may be variable, with respect to fixed outlet 18 to begin forming a coil body portion 87 of the coil spring 30. After the coil body portion 87 is formed, the coiling tool 20 is withdrawn by the numerical controlled machine 12. After a short period of time passes during which the spring 30 is clipped from the wire 16, the process is repeated and a second spring is formed. During formation of the second spring, the coiling tool 20 under control of machine 12 macro-positions the coiling surface 24 for creation of the main coil body of the second spring. Because the spring winding machine only macro-positions the coiling surface, a spring is formed which may have about 0.003 inch outer diameter variations in the main coil body.

It should be apparent that any number and/or variations of tools can be provided and positioned with respect to the fixed outlet 18 in order to provide and form various desired sizes, shapes and types of springs. For example, the spring winder is not limited to forming coil springs. Conical shape springs, or springs that start with a small diameter and then advance to a larger diameter can also be formed under control of the spring winding machine 12. In addition, the coiling surface could also be a two point coiling surface for forming various springs.

It should also be apparent that the type of wire used may have many variations. For example, round, rectangular, or barrel cross-sectional structure wires can be used, but the present invention is not limited thereto. It will be appreciated that coil springs of many types and sizes can be made with the present adaptive spring winder 10. Conventional coil springs having a consistent inner diameter or outer diameter can be made out of a wide variety of wire.

Figure 3A:
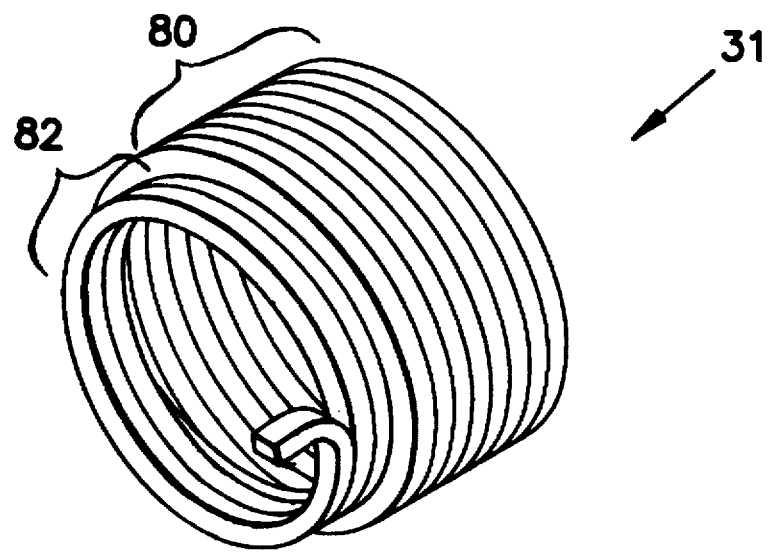
FIG. 3A is a perspective view of an exemplary spring.

One type of spring which can be formed is shown in FIG. 3A. The coil spring 31 is a dual diameter spring which includes a first portion 80 which has an inner diameter that is larger than the inner diameter of a second portion 82. The outer diameters of the first and second portions are also of different dimensions. The spring winding machine 12 can produce a spring with various dimensions under numerical control and can easily produce a spring with a single sized body portion having a single inner and outer diameter as shown in FIG. 3B.

Figure 3B:
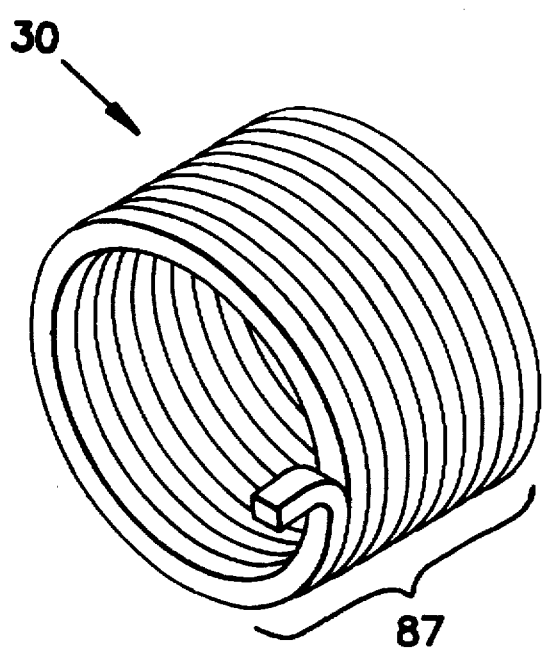
FIG. 3B, 3C and 3D, are a perspective view, an end view and a plan view, respectively, of an additional exemplary coil spring.
Figure 3C:
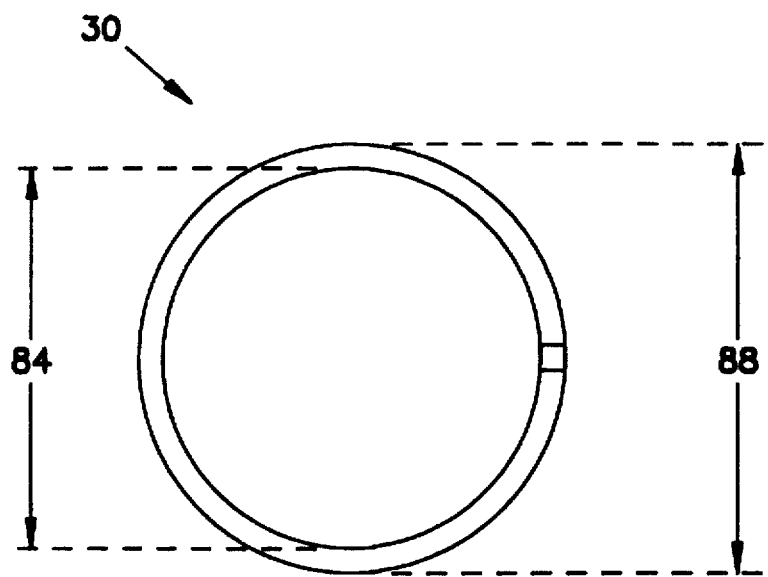
Figure 3D:
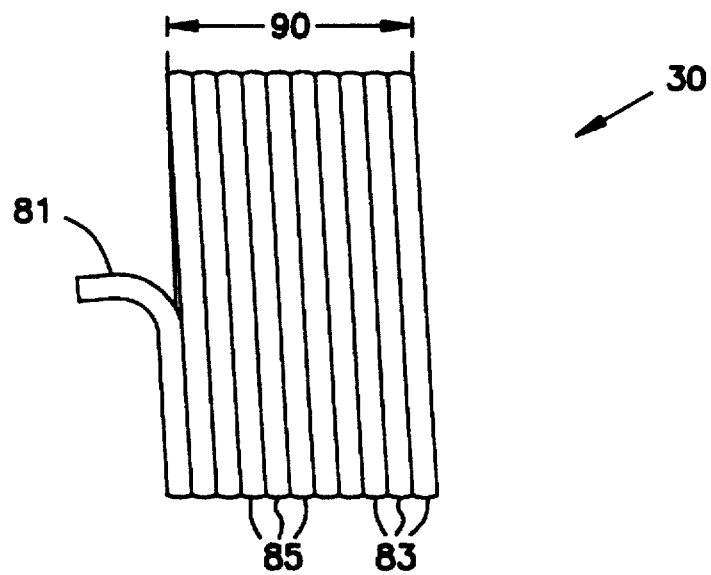

Spring 30, shown in FIGS. 3B–3D, having a main body portion 87 with a single inner and outer diameter will be used in the remaining description of the preferred embodiment for simplicity. The spring 30 has a body portion 87 with an outer diameter 88 and inner diameter 84 along the entire bony portion 87 of length 90. Coil spring 30 includes a certain number of wraps 83, 85 each having an inner diameter 84 and outer diameter 88. The toe 81 is formed for connection of the coil spring in its particular application. For example, the toe can interface the spring into an electrical clutch used in copy machines which push paper repetitiously and continually. For such an application, the springs must be manufactured to strict tolerances and be consistent in dimensions throughout. The dimensions, in particular the inner and outer diameter, of wraps 83 must be consistent with the dimensions of wraps 85. Not only must the dimensions of spring 30 be consistent throughout a particular spring itself, but the dimensions of springs in a batch or lot must also have consistent parameters. Because of the need for parameters with tight tolerances and consistency, the numerical controlled spring winder 12 is combined with other elements as explained below to form the adaptive spring winder 10.

The adaptive spring winder 10, as shown in FIGS. 1 and 2, includes, in addition to the numerical controlled spring winder 12, a system 11 for providing control of coiling point 22 such that various parameters of coil spring 30 can be controlled by adjusting the coiling point 22, and thus coiling surface 24, as the spring is being formed. The adaptive spring winder 10 includes computer 40, preferably a Compaq 386s, 20 MHz, computer, which receives signals from LVDT 32.

Figure 4:
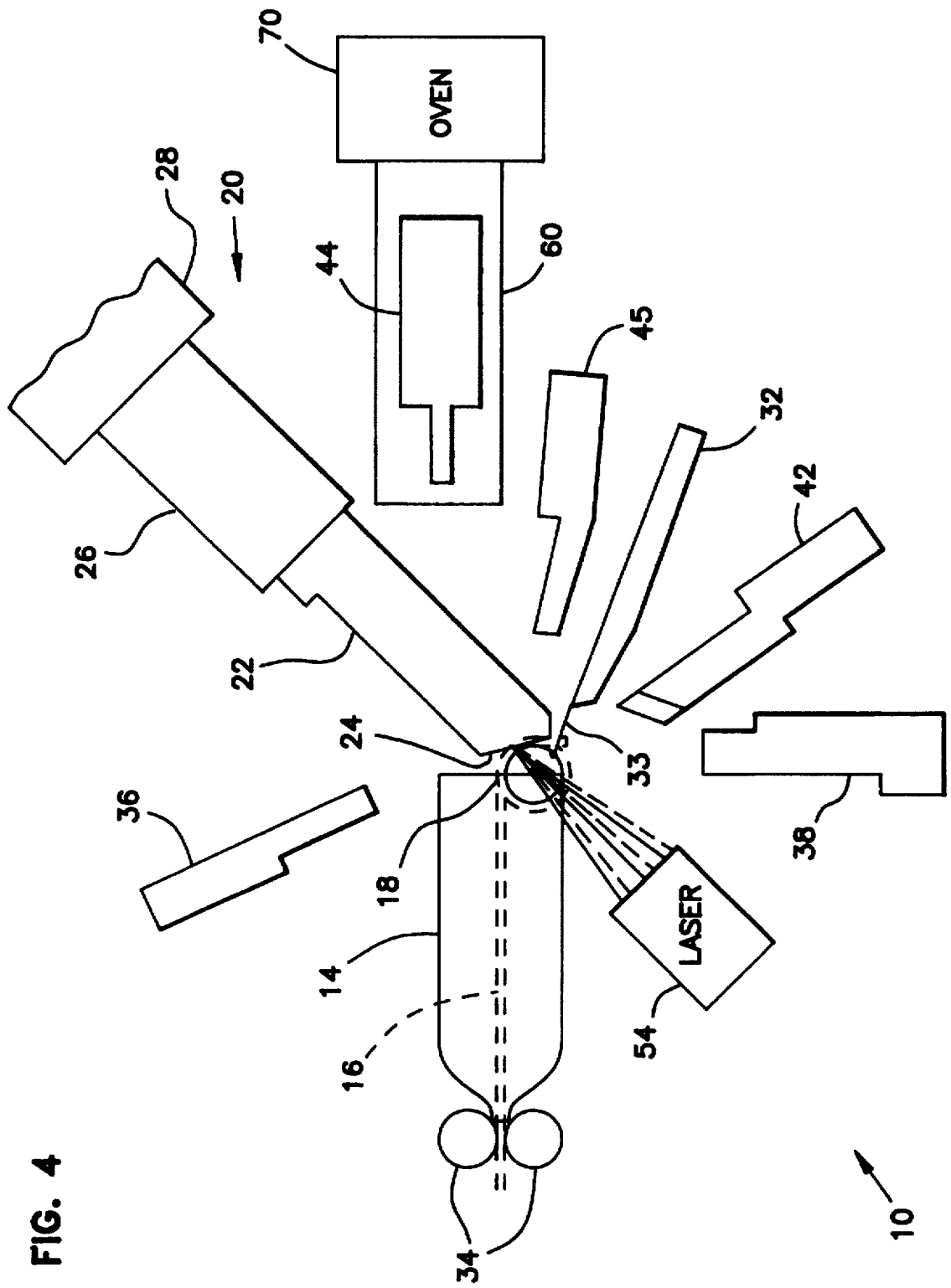
FIG. 4 is a diagrammatical view of the tools shown in FIG. 1 with varied position of the tools and additional elements for the spring forming process.

LVDT 32, in the preferred embodiment, is a Schaevitz DTR-451 digital transducer with a PCA-499 probe. The LVDT 32 is positioned as shown in FIG. 4 for measurement of parameters of coil spring 30. The LVDT 32 detects the position of the wire as it is deflected from coiling surface 24 while the coil spring 30 is being formed. The detection of the wire is made relative to the fixed outlet 18 and outputs signal indicative of a physical characteristic of the deflected wire. The position of the wire can be detected anywhere downstream from the fixed outlet 18, whether prior or after deflected by coiling surface 24. In the preferred embodiment, the LVDT 32 is positioned to detect the inner diameter 84 of coil spring 30 after the wire 16 is deflected from coiling surface 24 to form part of the main coil body 87 of coil spring 30. The inner diameter 30 being the parameter to be controlled for dimensional variation. The inner diameter is measured by detecting the free coil radius, one-half of the diameter.

The inner diameter is not the only parameter which can be controlled by the adaptive spring winder 10 utilizing position detection LVDT 32.. Measurements for controlling the outer diameter are also performed by positioning the LVDT with respect to the outer diameter. If both parameters are to be controlled at different times, an LVDT can be positioned both at the inner and outer diameters to detect positions thereof.

Analog signals which are proportional to the change in distance measured by the probe 33 of the LVDT 32 are provided to input/output circuitry 48 via signal conditioning circuitry 35, whereby the analog signals from LVDT 32 are digitized by analog to digital converter 52. A set reference point for such measurements is known and the LVDT 32 indicates that the probe 33 of LVDT 32 is at different point by means of the digitized signals applied to CPU 62 under control of software 64. A standard proportional integral differential control (PID) algorithm is used as the control algorithm to generate control signals as a function of the digitized analog signals from LVDT 32. These digital control signals are applied to input/output 48 by CPU 62 and are converted to an analog signal by digital to analog converter 56. The analog control signals are then applied to amplifier 46 to be amplified for driving piezoelectric translator 50 operatively mounted on piezo slide 26, to micro-position coiling surface 24 to substantially uniformly maintain the inner diameter 84 of coil spring 30 as the spring is formed. In the preferred embodiment, amplifier 46 is a Kepco BOP 100-4M power supply.

Position detection performed by LVDT 32, indicative of changes in the parameters of the spring can be performed by other devices. A laser gauge can be used by shooting beams off a point on the wire. Reflected beams are received by a laser beam detector. Triangulation techniques known in the art, are utilized to measure distance changes from the detection of the reflected beams.

An inductive probe can also be used for position detection of iron based materials. There are other numerous ways to detect the position of the wire indicative of parameters of the spring as the spring is being formed and the listing of a few in no way limits the invention to those particular devices.

The piezoelectric translator 50 is operatively mounted on piezo slide 26 to micro-position the coiling point 22, and by virtue thereof the coiling surface 24, with regard to fixed outlet 18. The piezo slide 26 with piezoelectric translator 50 mounted thereon is shown in FIG. 5. In the preferred embodiment, the piezoelectric translator is a Physik Instrumente GmbH and Company 844.60 LVPZ piezoelectric actuator. The piezoelectric translator 50 is capable of traveling approximately 0.0035 of an inch; therefore, it micro-positions, in contrast to gross positioning, the coiling point 22 for controlling the deflection of wire 16 such that the parameter being controlled in response to position detection by LVDT 32 is substantially uniformly maintained during the forming of the spring. The macro-positioning of the coiling point is performed under control of the standard spring winding machine 12.

Figure 5A:
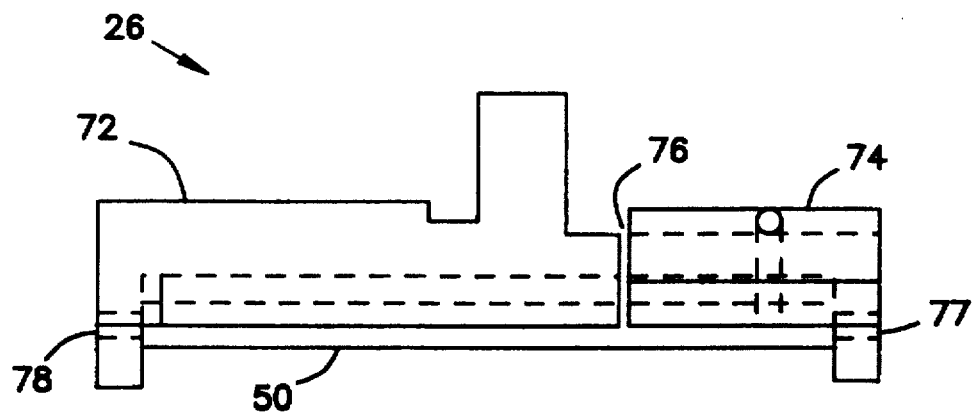
FIG. 5A, 5B, 5C and 5D are front view, plan view, and end views, respectively, of the piezoelectric translator and piezo slide of the present invention.
Figure 5B:
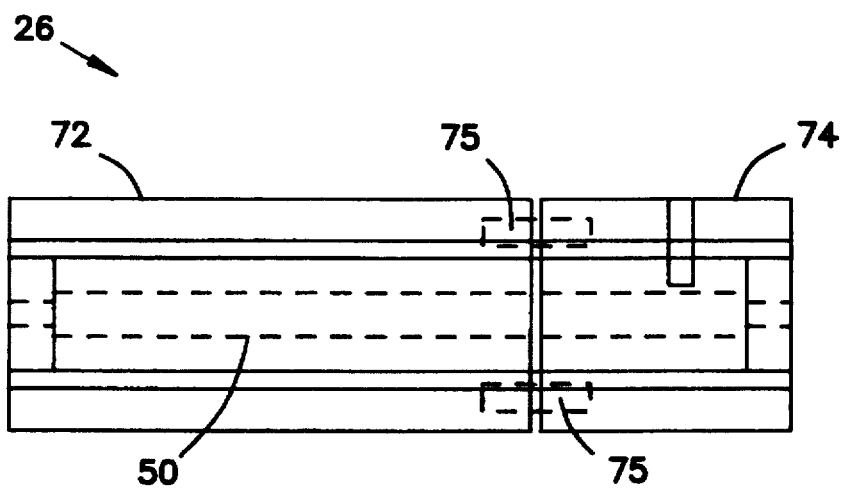
Figure 5C:
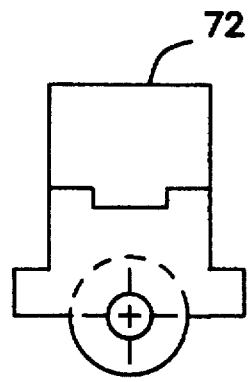
Figure 5D:
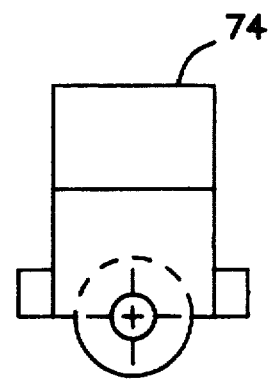

FIG. 5 shows the piezo slide 26 with piezoelectric translator 50 mounted thereon, in front view, FIG. 5A, top view, FIG. 5B, and end views FIG. 5C and 5D. The piezo slide 26 has a first side 72 which is operatively connected to coiling point 22. A second side 74 is connected to the numerically controlled spring winder 12 by means of cam assembly and drive mechanism 28 controlled by the numerically controlled spring winding machine 12. Slide 26 includes a gap 76 for allowing micro-positioning of the coiling point by way of the piezoelectric translator 50. In the preferred embodiment, the piezo slide is approximately 6 inches long and the gap allows for movement of the piezoelectric translator 50 a distance of approximately 0.0035 of an inch. The first side 72 is mated with the second side 74 by pins 75. The piezoelectric translator 50 is positioned in a threaded mounting hole 78 and mounting hole 77. As control signals from amplifier 46 are received, the piezoelectric translator 50 responds thereto and moves side 72 relative to side 74 as side 74 is fixed to drive and cam assembly system 28. This movement translates into micro-positioning of coiling surface 24. The piezoelectric translator 50 is capable of micro-positioning the coiling surface 24 at 400 Hz while the adaptive spring winder 10 is forming a spring at a speed of 50 meters/min. It should be appreciated that the translator could also take the form of a magnetostrictive or electrostrictive translator.

Thus far, the detailed description of adaptive spring winder 10 has been described with regard to forming a single spring. In order to control the parameters at the start of forming a second spring, additional elements of system 11 for adjustment of coiling point 22 are provided. After a first spring has been formed, the coiling point 22 is withdrawn from its position with respect to fixed outlet 18 by the numerically controlled spring winding machine 12. Clipping tool 36 is then utilized to clip the first spring from wire 16 fed from quill 14. In order to bring coiling point 22 into a position such that the main coil body of a second spring can be formed with a consistent starting parameter, in the preferred embodiment an inner diameter which is equivalent to the diameter 84 of the first spring, laser 54 is provided.

Laser 54 is utilized to detect the position of coiling surface 24 prior to retraction or withdrawal of coiling point 22 and clipping of the first spring. The laser, preferably a Keyence LC2100, projects three beams from laser beam portion 66 under control of laser box 68 from different angles onto a single point on coiling surface 24. Laser beam portion 66 receives the reflected beams. Signals regarding the angles of the reflected beams are applied to laser box 68 to be manipulated using triangulation for generation of signals indicative of the distance of the coiling point 22 from the laser 54. A distance position signal is provided by laser box 68 and applied via input/output 58 to CPU 62. A digital distance signal is generated by CPU 62 under the control of software 64. This distance signal is provided to input/output 48 which in turn converts it from a digital signal to an analog distance control signal by digital to analog converter 56. The analog signal is applied to amplifier 46, which amplifies the signal for driving the piezoelectric translator 50 and micro-positioning coiling surface 24.

The laser 54 measures the distance of the coiling surface 24 to laser 54 prior to retraction of the coiling point 22 by the numerically controlled spring winding machine 12 after forming the first spring and stores this measurement in memory (not shown) associated with computer 40. When the coiling point 22 is brought into position with respect to fixed outlet 18 by the numerically controlled spring winding machine 12 to form the second spring, the laser 54 detects the distance of the coiling surface 24 after it has been brought into such position and provides a distance signal for comparison with the location prior to retraction. The digital distance signal is produced as a function of the comparison for controlling the micro-positioning of the coiling surface 24 to within 40 millionth's of an inch by means of piezoelectric translator 50.

Therefore, the parameter being controlled in response to position detecting by the LVDT 32 while the spring is being formed is controlled at the initial point of formation of the second spring by micro-positioning of the coiling surface 24 with use of laser 54. Once a correct position of the inner diameter 84 is sensed by LVDT 32, the computer 40 switches from the laser signal and then uses the LVDT signal for providing control of the piezoelectric translator 50 and for controlling the parameter of the second spring as it is being formed. The position of the coiling surface 24 measured by the laser 54 can also be measured by other spacial measuring devices such as LVDT's, induction gauging, etc.; thus, this invention is not limited to use of laser 54.

Figure 6:
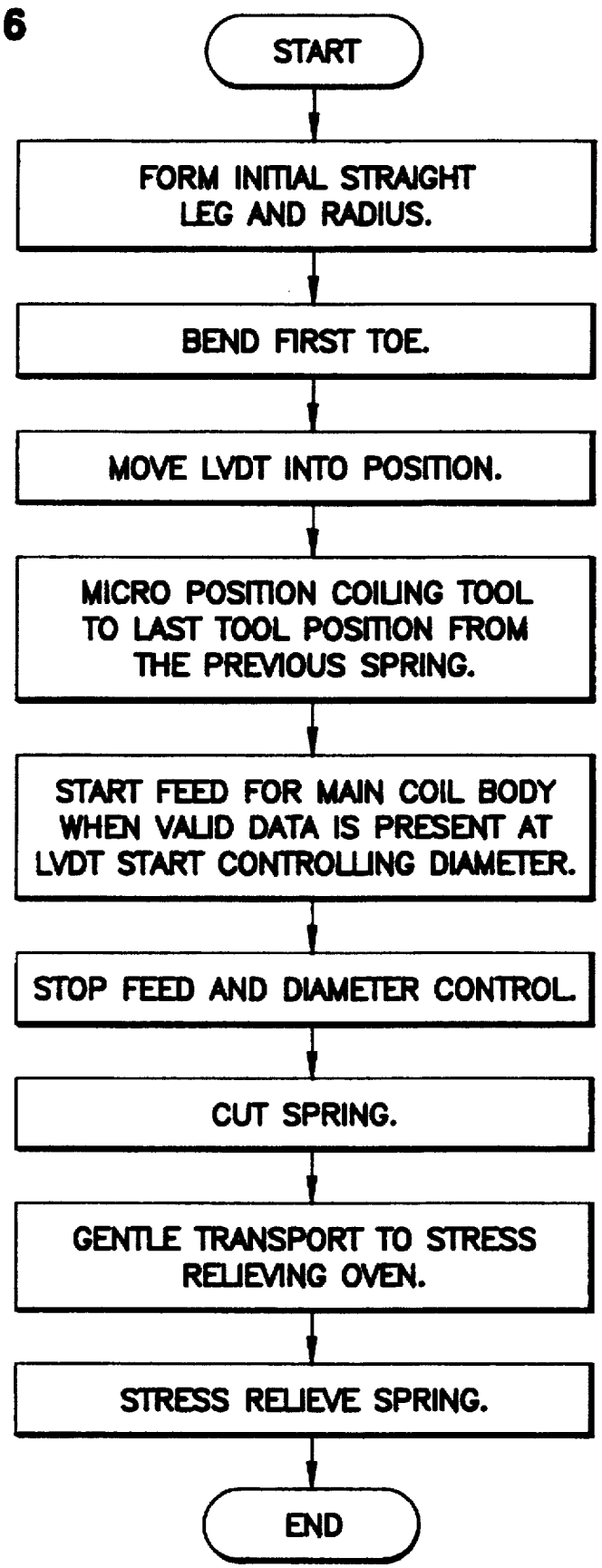
FIG. 6 is a flow chart of the method of winding a spring of the present invention.
Figure 7:
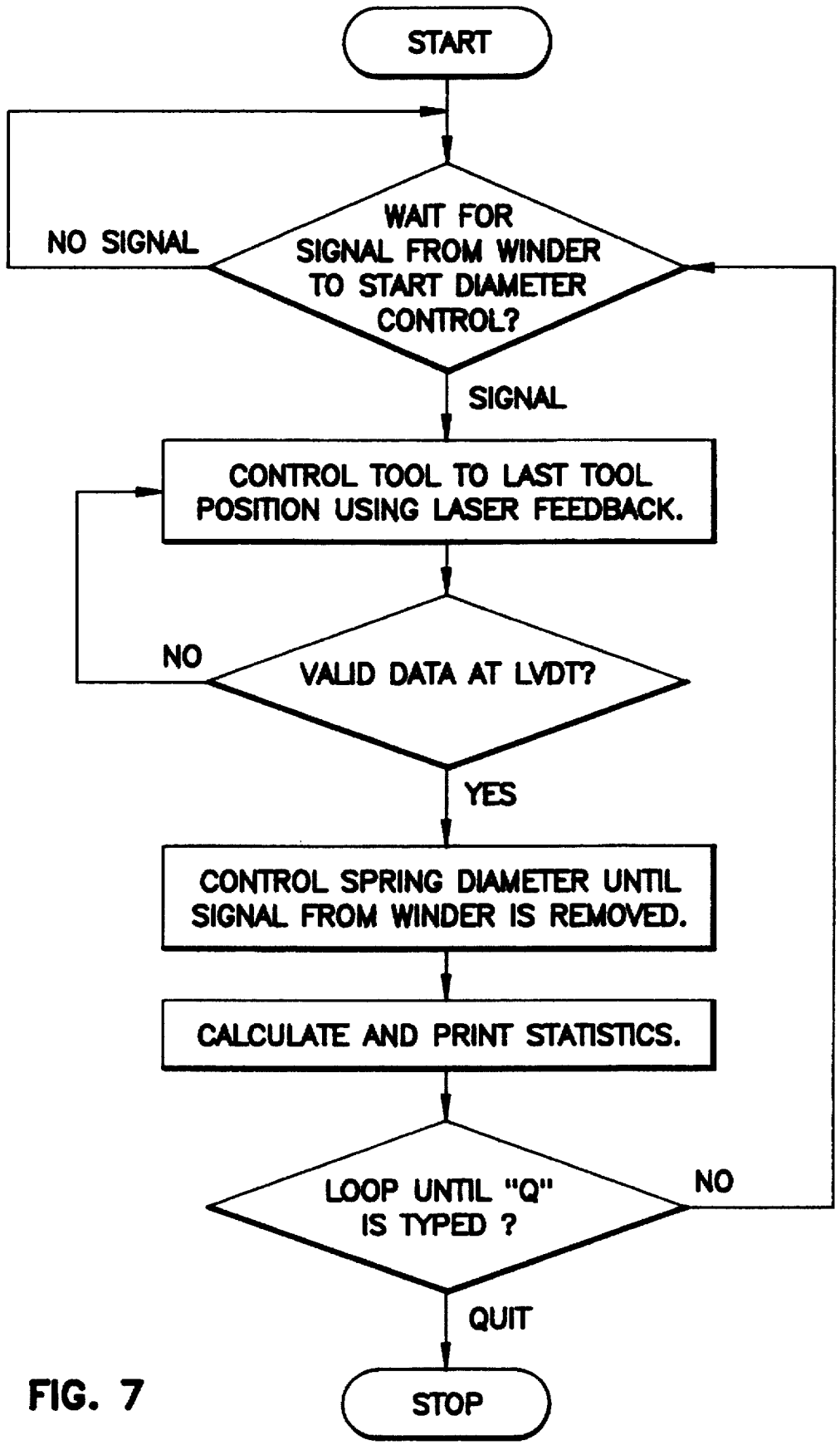
FIG. 7 is a flow chart for controlling a parameter of the spring as it is being formed according to the flow chart of FIG. 6.

Referring to FIGS. 1–5, and further in reference to the flow charts of FIGS. 6 and 7, a method of forming a spring and a plurality of springs is described. Upon initialization, the numerical controlled spring winding machine 12 feeds wire 16 by way of feed rollers 34 through quill 14 to fixed outlet 18 and into a path extending downstream from the fixed outlet 18. The coiling tool 20 is brought in to form a one-quarter wrap. The coiling tool is then removed and the spring winding machine 12 then positions toe bender tool 42 and bending mandrel 45 to deflect the wire from its path to begin formation of an initial straight leg for toe 81, FIG. 3. When the desired toe 81 is achieved, toe bender tool 42 is withdrawn from the bending mandrel 45 and fixed outlet 18 and the toe overbend tool is brought forward to bend the initial straight leg into the desired shape of first toe 81, FIG. 3.

After the toe 81 is formed, all remaining toe bending tools are withdrawn from the fixed outlet 18 and LVDT 32 is moved into position to begin monitoring the wire to output signals for controlling the inner diameter parameter of the spring 30. The coiling point 22 is macro-positioned into a location with respect to the fixed outlet 18 by the numerically controlled spring winding machine 12 per cam assembly and drive mechanism 28 operatively connected to the coiling point by piezo slide 26. The macro-positioning of the coiling point 22, and thus the coiling surface 24, allows the formation of a spring with a diameter having dimension variations of about 0.003 of an inch. LVDT 32 is positioned such that the probe 33 of LVDT 32 is at a location corresponding to the desired inner diameter 84 of coil spring 30. The LVDT can be utilized to control the outer diameter or the inner diameter of coil spring 30 as the spring 30 is being formed from wire 16 as discussed previously.

As shown in FIG. 6, the coiling point 22 of coiling tool 20 is micro-positioned to the last tool position from the previously formed spring after the LVDT 32 is positioned in forming the first spring, a set position is utilized to micro-position the coiling surface 24 thereto, whereas in forming additional springs, the last tool position is utilized as measured by laser 54. The steps of: micro-positioning the coiling tool to the last tool position (or set reference position if forming a first spring), starting the feed for the main coil body when valid data is present at the LVDT 32, and stopping the feeding and diameter control, are initiated by a signal from the numerical controlled spring winding machine 12 as shown in the flow chart of FIG. 7.

After a signal is received to begin diameter control of the main coil body of the spring, FIG. 7, laser 54 is then utilized to micro-position the coiling surface 24 of coiling tool 20 to the last position of the tool when forming a second spring or to the set reference position if forming an initial first spring. The laser 54 detects the location of coiling surface 24 as macro-positioned by numerical controlled spring winder 12 to form the main coil body 87. Computer 40 under the control of software 64 receives the distance signals from the laser measurement. As previously described computer 40 generates a distance control signal which is applied to amplifier 46 and to piezoelectric translator 50 operatively mounted in piezo slide 26 to micro-position coiling point 22 to the position of the coiling tool 20 after formation of a first spring, or if the initial first spring is being formed to the set reference position. The distance control signal for the formation of the initial first spring is generated by comparison of the laser measurement to the set reference position and for any additional spring it is generated by comparison to the position as measured by laser 54 prior to retraction of the coiling point 22 after formation of a main coil body of a previous spring.

Wire 16 is then fed for formation of the main coil body of coil spring 30. When valid data is present at the LVDT 32 positioned on the inner diameter it is indicated that signals from laser 54 can be suspended and that diameter control during formation of the main coil body is achieved as a function of position detection by LVDT 32 as described below and described previously with respect to the spring winder 10.

LVDT 32 is now at a position to begin controlling the diameter of coiling spring 30 by adjustments made by piezoelectric translator 50 as a function of signals from the LVDT. With the LVDT 32 taking continuous measurements, the coiling surface 24 of coiling point 22 deflects the wire 16 from its path from fixed outlet 18 to form a coiling spring 30 having an outer diameter 88 and an inner diameter 84. The coiling surface 24 lies in a second plane which is at an angle of about 10° to 15° relative to a first plane which lies transverse to the path of the wire 16 being fed from fixed outlet 18. Such an angle is predetermined depending on the desired parameters of the coil spring.

LVDT 32 positioned at the diameter of the now forming spring 30 detects whether there is a change in the position of the wire by probe 33 of LVDT 32. A signal representative thereof is generated. The analog signal is received by computer 40 which generates control signals by means of a standard algorithm as described previously. The control signals are applied to amplifier 46 for driving piezoelectric translator 50 operatively mounted in piezo slide 26. Therefore, as the remainder of the coil spring 30 is formed, LVDT 32 provides signals at a minimum of 400 Hz for control of the parameter it is monitoring to correct for variations therein.

As shown in FIG. 7, as the spring is being formed, statistics are calculated and printed showing the variations in the change of parameters of the coil spring 30. Also, the spring inner diameter 84 is controlled by LVDT 32 until the signal from numerically controlled spring winding machine 12 is removed indicating that a desired length 90 of coil spring 30 has been achieved and the wire 16 fed from fixed outlet 18 is stopped. Diameter control, as shown in FIG. 7, is looped for each spring formed until the method is terminated.

The size of the spring, the parameters of the spring, the length of the spring, and the variations within the spring, for example, first portion 80 having a larger diameter then second portion 82 as shown in FIG. 3A, are provided for by macro-positioning the coiling point by means of numerically controlled spring winding machine 12. Micro-positioning by the piezoelectric translator 50 controls the parameters such that variations in the parameters can be reduced. The control of coiling point 22 via means of the piezoelectric translator 50 correct for variations in the coiling process due to machine variation, tool wear and wire variation, as described previously in the Background of the Invention section.

Once a spring has been formed to its desired parameters, the coil spring is cut by clipping tool 36 from the wire 16 being fed from fixed outlet 18. When the coil spring 30 is cut from the wire 16 being fed from fixed outlet 18, the procedure described with reference to FIGS. 6 and 7 is repeated to form additional springs. A second spring is begun by detecting the position of coiling point 22 by laser 54 prior to withdrawal of coiling point 22 from its location with respect to fixed outlet 18 after the formation of the first spring. An initial first leg is formed and the coiling tool is once again macro-positioned by the numerical spring winding machine 12 to begin forming an additional spring after it is micro-positioned as a function of signals from laser 54.

After the coil spring 30 is cut from the wire 16, the coil spring 30 is gently transported to a stress-relieving oven 70 by holding probe 44 and chute 60, shown diagrammatically in FIG. 4. Holding probe 44 catches the coil spring after it is clipped by clipping tool 36 and gently places the coil spring 30 into a chute 60 which transports it to oven 70, also shown diagrammatically in FIG. 4. This gentle transportation eliminates a widening in the variations of parameters of the coil spring due to stress added by having the coil springs bouncing off a pan or object after the coil spring is clipped.

The oven 70 is a continuous heat treatment oven designed by Despatch Industries, Minneapolis, Minn. The oven 70 is a continuous flow oven which provides a uniform temperature profile across the total range such that each spring which travels through the oven is heat treated in the same manner. The oven includes one conveyor belt which travels at an average speed of 1.6 inches per minute. The oven also maintains a consistent temperature profile throughout the entire belt. Such consistent heat treatment reduces variations in parameters of the coil springs. The flow oven is substantially enclosed and the springs are preferably heat treated at a temperature of 500° F., plus or minus 1° C. The coil spring is treated for approximately 20 minutes.

When the adaptive spring winder 10 is forming a plurality of springs, a spring is clipped every four to seven seconds, necessitating the withdrawal of the coiling tool 20 and the repositioning of the coiling tool after each spring is formed. The wire is fed through the feed rollers 34 at approximately 50 meters per minute. The entire system 11 is running at approximately 400 Hz and measurements from the LVDT 32 and laser 54 are taken at 400 Hz; the piezoelectric translator being adjusted accordingly. Standard numerical controlled spring winding machines utilizing only macro-positioning of the coiling point 22 cannot achieve a coil spring 30 with consistency and narrow tolerances as provided by the adaptive spring winder 10 with micro-positioning as described previously. Such consistency is provided in the parameters of the coil spring 30 from wrap to wrap of a single spring and also from spring to spring. With use of the adaptive spring winder 10, the outer diameter of a spring is controllable within a standard deviation of about 0.00020 inches as opposed to about 0.00055 inches when no micro-positioning control is utilized; more than a 200% improvement. Dimensional tests using a micrometer on the outer diameter were run on 32 springs when the inner diameter was controlled, and the results are shown as follows in Table I:

TABLE I

| spring | micro-positioning control | no micro-positioning control |
|---|---|---|
| 1 | 0.5690 | 0.5722 |
| 2 | 0.5691 | 0.5723 |
| 3 | 0.5691 | 0.5726 |
| 4 | 0.5691 | 0.5727 |
| 5 | 0.5691 | 0.5727 |
| 6 | 0.5691 | 0.5728 |
| 7 | 0.5691 | 0.5728 |
| 8 | 0.5692 | 0.5728 |
| 9 | 0.5692 | 0.5731 |
| 10 | 0.5693 | 0.5731 |
| 11 | 0.5693 | 0.5731 |
| 12 | 0.5693 | 0.5732 |
| 13 | 0.5694 | 0.5732 |
| 14 | 0.5694 | 0.5733 |
| 15 | 0.5694 | 0.5734 |
| 16 | 0.5694 | 0.5734 |
| 17 | 0.5694 | 0.5735 |
| 18 | 0.5694 | 0.5735 |
| 19 | 0.5694 | 0.5735 |
| 20 | 0.5695 | 0.5735 |
| 21 | 0.5695 | 0.5736 |
| 22 | 0.5695 | 0.5736 |
| 23 | 0.5695 | 0.5736 |
| 24 | 0.5695 | 0.5737 |
| 25 | 0.5696 | 0.5737 |
| 26 | 0.5696 | 0.5738 |
| 27 | 0.5696 | 0.5739 |
| 28 | 0.5696 | 0.5740 |
| 29 | 0.5696 | 0.5740 |
| 30 | 0.5696 | 0.5741 |
| 31 | 0.5696 | 0.5743 |
| 32 | 0.5697 | 0.5743 |
| avg | 0.5694 | 0.5734 |
| std dev. | 0.00020 | 0.00055 |

In addition, the outer diameter of a single coil spring from wrap to wrap can be maintained consistently at variations of less than one thousandth's of an inch when micro-positioning is utilized.

Throughout the above description of the preferred embodiment, control of a diameter of the coil springs is addressed; either inner diameter or outer diameter. Other spring rate parameters of springs can be equally important, including torsion rates, compression rates and extension rates of springs.

In the same manner as micro-positioning the coiling tool for controlling the parameters of inner and outer diameter, compression rate can also be controlled by micro-positioning a pitch tool or a coiling surface while forming a compression spring. Instead of using an LVDT to measure the position of the outer diameter of the spring to control the position of coiling point 22, and thus coiling surface 24, a force probe detects a force of the deflected wire indicative of a compression rate as the spring is being formed. The detected forces are utilized to control the pitch of the coiling surface as the wire 16 is fed from the fixed outlet 18 to compensate for changes in compression rate in the coiling process due to machine variation, tool wear and wire variation.

The measurements made by the force probe are used to control a piezoelectric translator on a pitch control tool or a coiling surface tool in a similar manner piezoelectric translator 50 is operatively mounted on piezo slide 26 and controlled by computer 40 when controlling a diameter of a coil spring. The pitch of the wire is controlled as it is being deflected from its path from fixed outlet 18. Force probes such as strain gauges are used to measure such forces during the formation of the spring and to provide signals to computer 40, in a manner like LVDT 32 is used to detect position indicative of the diameter. The laser 54 is still used to begin the forming of a compression spring at a correct pitch similar to the initial diameter control when forming a coil spring. An LVDT or a laser may also be used to detect deflections of known material to determine forces.

The compression rate of a compression spring can also be controlled by varying the diameter of the spring in response to the force detected by a strain gauge or similar force detecting device. As the forces of the compression spring being formed change, as a function of the compression rate, signals indicative of the forces are applied to a computer and control signals generated thereby control the micro-positioning of the coiling surface to vary diameter of the spring, thus controlling the compression rate.

The torsion rate of a torsion spring and the extension rate of an extension spring can also be controlled by varying the diameter of the spring in response to the force detected by a strain gauge or other similar detecting device. As the forces of the torsion or extension spring being formed change, as a function of a change in torsion or extension rate, signals indicative of the forces are applied to a computer and control signals generated thereby control the micro-positioning of the coiling surface to vary the diameter of the torsion or extension spring, thus controlling the torsion or extension rate.

It is to be understood, however, that even though numerous characteristics of the present invention have been set forth in the foregoing description, together with the details of the structure and function of the invention, the disclosure is illustrative and changes in matters of order, shape, size and arrangement of the parts may be made within the principles of the invention and to the full extent indicated by the broad general meaning of the terms in which the appended claims are expressed.

What is claimed is:

1. An apparatus for forming a spring from a wire, said apparatus comprising:

means for feeding the wire from a fixed outlet against at least one coiling surface having a variable location in relation to said fixed outlet, said fixed outlet directing the wire in a path, the wire being deflected from the path by the coiling surface so as to bend the wire;

means for monitoring the wire by directly sensing the wire as the wire is deflected from the path by the coil surface and for generating output signals indicative of a physical characteristic of the deflected wire;

control means for receiving said output signals and generating control signals as a function thereof; and actuation means responsive to said control signals for adjusting the location of said coiling surface such that said physical characteristic is substantially uniformly maintained during the forming of the spring.

2. An apparatus according to claim 1, wherein said monitoring means comprises detection means for detecting a position of the wire indicative of a diameter of the spring.

3. An apparatus according to claim 2, wherein said detection means include a linear variable differential transducer positioned relative to said fixed outlet of said feeding means through which the wire is fed.

4. An apparatus according to claim 2, wherein said detection means include a laser for directing laser beams at a surface of the wire and means for receiving the reflection of said laser beams.

5. An apparatus according to claim 2, wherein said detection means include an inductive gauging device positioned relative to said fixed outlet of said feeding means through which the wire is fed.

6. An apparatus according to claim 1, wherein said actuation means include a piezoelectric translator for adjusting said coiling surface.

7. An apparatus of claim 1, wherein said monitoring means include means for detecting a force of said deflected wire indicative of a compression, torsion and/or extension rate of the spring.

8. An apparatus according to claim 7, wherein said detecting means include at least one strain gauge.

9. An apparatus for forming a spring from a wire, said apparatus comprising:

means for feeding the wire from a fixed outlet against at least one coiling surface having a variable location in relation to said fixed outlet, said fixed outlet directing the wire in a path, the wire being deflected from the path by the coiling surface so as to bend the wire;

means for monitoring the wire and for generating output signals indicative of a physical characteristic of the deflected wire;

control means for receiving said output signals and generating control signals as a function thereof; and actuation means responsive to said control signals for adjusting the location of said coiling surface such that said physical characteristic is substantially uniformly maintained during the forming of the spring, wherein said actuation means include:

retraction means for withdrawing said coiling surface from a first position relative to said fixed outlet after a first spring has been formed;

repositioning means for macro-positioning the coiling surface, subsequent to retraction thereof, generally to the first position; and reposition adjustment means for micro-adjusting said coiling surface in cooperation with said control means substantially to the first position for formation of a second spring.

10. An apparatus according to claim 9, wherein said reposition adjustment means include:

means for detecting the first position of the coiling surface prior to retraction and a second position of the coiling surface after the coiling surface is macro-positioned generally to the first position and for generating position signals representative of said first and second positions, said control means receiving said position signals and generating adjustment control signals as a function thereof, said actuation means responsive to said adjustment control signals for adjusting said coiling surface to said first position.

11. An apparatus according to claim 10, wherein said means for detecting the first position of the coiling surface prior to retraction and the second position of the coiling surface after the coiling surface is macro-positioned, includes a laser.

12. An apparatus according to claim 9, further comprising:

means for clipping said first spring after withdrawing said coiling surface;

probe means for catching the first spring after it is clipped; and handling means for directly receiving said first spring from said probe means, and for positioning and placing said first spring within an oven means for heat treating at least said first spring.

13. An apparatus according to claim 12, wherein said oven means include means for continuously heat treating at least said first spring at a consistent temperature and for providing a uniform temperature profile throughout said oven means.

14. An apparatus for forming a spring form a wire, said apparatus comprising:

means for feeding the wire from a fixed outlet against at least one coiling surface downstream therefrom having a variable location in relation to said fixed outlet, said fixed outlet directing the wire in a path, the wire being deflected from the path by the coiling surface so as to bend the wire;

position detection means for sensing a position of the wire by directly sensing the wire as the wire is deflected from the path by the coiling surface downstream from the fixed outlet indicative of a parameter of the deflected wire and for generating output signals representative thereof;

control means for receiving said output signals and generating control signals as a function thereof; and actuation means responsive to said control signals for adjusting the location of said coiling surface such that said parameter is substantially uniformly maintained during the forming of the spring.

15. An apparatus according to claim 14, wherein said position detection means include means for sensing a position of the wire indicative of a diameter of the spring.

16. An apparatus according to claim 15, wherein said sensing means include a linear variable differential transducer positioned relative to said fixed outlet of said feeding means through which the wire is fed.

17. An apparatus according to claim 15, wherein said sensing means include:

a laser for directing laser beams at a surface of the wire; and means for receiving the reflection of said laser beams.

18. An apparatus according to claim 15, wherein said sensing means include an inductive gauging device positioned relative to said fixed outlet of said feeding means through which the feed wire is fed.

19. An apparatus according to claim 14, wherein said actuation means include a piezoelectric translator for adjusting said coiling surface.

20. An apparatus for forming a spring from a wire, said apparatus comprising:

means for feeding the wire from a fixed outlet against at least one coiling surface downstream therefrom having a variable location in relation to said fixed outlet, said fixed outlet directing the wire in a path, the wire being deflected from the path by the coiling surface so as to bend the wire;

position detection means for sensing a position of the wire downstream from the fixed outlet indicative of a parameter of the deflected wire and for generating output signals representative thereof;

control means for receiving said output signals and generating control signals as a function thereof; and actuation means responsive to said control signals for adjusting the location of said coiling surface such that said parameter is substantially uniformly maintained during the forming of the spring, said actuation means include:

retraction means for withdrawing said coiling surface from a first position relative to said fixed outlet after a first spring has been wound;

reposition means for macro-position the coiling surface generally to the first position of the coiling surface prior to retraction; and reposition adjustment means for micro-adjusting said coiling surface substantially to the first position of the coiling surface prior to retraction for formation of a second spring.

21. An apparatus according to claim 20, further comprising:

clipping means for clipping said first spring after withdrawing said coiling surface;

probe means for catching the first spring after it is clipped; and handling means for directly receiving said first spring from said probe means, and for positioning and placing said first spring within an oven means for continuous heat treating at least said first spring at a consistent temperature and for providing a uniform temperature profile throughout said oven means.

22. An apparatus for forming a plurality of springs from a wire, said apparatus comprising:

means for feeding the wire from a fixed outlet against at least one coiling surface having a variable location in relation to said fixed outlet, said fixed outlet directing the wire in a path, the wire being deflected from the path by the coiling surface so as to bend the wire;

retraction means for withdrawing said coiling surface from said fixed outlet after a first spring has been wound;

repositioning means for macro-positioning the coiling surface generally to the position of the coiling surface prior to retraction; and reposition adjustment means for micro-adjusting said coiling surface substantially to the position of the coiling surface prior to retraction for formation of a second spring.

23. An apparatus according to claim 22, wherein said reposition adjustment means include:

means for detecting a first position of the coiling surface prior to retraction and a second position of the coiling surface after the coiling surface is macro-positioned generally to the first position and for generating position signals representative of said first and second positions;

control means for receiving said position signals and generating adjustment control signals as a function thereof; and micro-adjustment means responsive to said adjustment control signals for adjusting said coiling surface substantially to said first position.

24. An apparatus according to claim 23, wherein said means for detecting the first position of the coiling surface prior to retraction and the second position of the coiling surface after the coiling surface is macro-positioned includes a laser.

25. An apparatus according to claim 22, further comprising:

means for monitoring the wire and for generating output signals indicative of a physical characteristic of the deflected wire;

control means for receiving said output signals and generating control signals as a function thereof; and actuation means responsive to said control signals for adjusting the location of said coiling surface such that said physical characteristic is substantially uniformly maintained during the forming of the spring.

26. A method for forming a plurality of springs from a wire, said method comprising the steps of:

(a) forming a first spring by feeding the wire through a fixed wire outlet and against at least one coiling surface positioned at a location in relation to said fixed wire outlet so as to deflect and bend the wire to form the first spring;

(b) withdrawing the coiling surface from said location in relation to said fixed wire outlet after a first spring is fondled;

(c) macro-positioning the coiling point generally to the location of the coiling point prior to withdrawal;

(d) detecting the location of the coiling surface prior to withdrawal and the location after macro-positioning the coiling point and generating position signals representative thereof; and (e) micro-adjusting the coiling surface, after macro-positioning the coiling surface, substantially to said location detected prior to withdrawal as a function of said position signals for formation of a second spring.

27. A method according to claim 26, further comprising:

monitoring the wire during the formation of any of said springs;

generating output signals indicative of a physical characteristic of the deflected wire during such formation; and micro-adjusting the location of the coiling surface as a function of the output signals so as to form springs for which the physical characteristic remains substantially uniform during the formation thereof.

28. A method according to claim 26, further comprising the steps of:

clipping each of said springs after a desired size of said each spring has been achieved;

catching said each spring as said each spring is being clipped;

placing said each spring into an oven; and continuously and consistently heat treating said plurality of springs for a desired time period and at a consistent temperature.

29. A method of forming a spring from a wire, said method comprising the steps of:

positioning at least one coiling surface at a location in relation to a fixed wire outlet;

feeding a wire through the fixed wire outlet and against said coiling surface so as to deflect the wire with said coiling surface to bend the wire;

detecting a position of the wire by directly sensing the wire as the wire is deflected from the path by the coiling surface downstream from said fixed wire outlet which is indicative of a parameter of the deflected wire and generating output signals representative thereof; and adjusting the location of the coiling surface as a function of said output signals such that said parameter is substantially uniformly maintained during the forming of the spring.

30. A method of forming a spring from a wire, said method comprising the steps of:

macro-positioning at least one coiling surface to a location in relation to a fixed wire outlet;

feeding a wire through said fixed wire outlet and against said coiling surface so as to deflect and bend the wire;

monitoring said wire by directly sensing the wire as the wire is deflected from the path by the coiling surface and generating output signals indicative of a physical characteristic of the deflected wire;

generating control signals as a function of the output signals; and micro-adjusting the location of the coiling surface in response to the control signals such that said physical characteristic is substantially uniformly maintained during the forming of the spring.

31. A method according to claim 30, wherein said step of monitoring said wire and generating output signals indicative of a physical characteristic of the deflected wire includes detecting a position of the wire downstream from said fixed wire outlet which is indicative of a diameter of the spring.

* * * * *

UNITED STATES PATENT AND TRADEMARK OFFICE
CERTIFICATE OF CORRECTION

PATENT NO. : 5,477,715
DATED : December 26, 1995
INVENTOR(S) : Kempf

It is certified that error appears in the above-indentified patent and that said Letters Patent is hereby corrected as shown below:

Col. 5, line 57 "cuter" should read --outer--

Col. 5, line 58 "bony" should read --body--

Col. 9, line 10 "positioned in" should read --positioned. In--

Col. 13, line 55 delete ":" after the word "first"

Col. 16, line 34 "fondled" should read --formed--

Signed and Sealed this

Tenth Day of December, 199

Attest:

BRUCE LEHMAN

Attesting Officer

Commissioner of Patents and Trademarks